(12) United States Patent
Hoyles et al.

(10) Patent No.: US 6,710,139 B2
(45) Date of Patent: Mar. 23, 2004

(54) EPOXY OR PHENOLIC FUNCTIONAL POLYESTER OR POLYETHER

(75) Inventors: Stephen M. Hoyles, Lake Jackson, TX (US); Ramki Subramanian, Pearland, TX (US); Marcos Franca, Lake Jackson, TX (US)

(73) Assignee: Dow Global Technologies Inc., Midland, MI (US)

( * ) Notice: Subject to any disclaimer, the term of this patent is extended or adjusted under 35 U.S.C. 154(b) by 202 days.

(21) Appl. No.: 09/879,532

(22) Filed: Jun. 12, 2001

(65) Prior Publication Data

US 2002/0042493 A1 Apr. 11, 2002

Related U.S. Application Data

(60) Provisional application No. 60/213,965, filed on Jun. 23, 2000.

(51) Int. Cl.[7] .................. C08G 59/14; C08L 63/00; C08L 63/02; C08L 63/10
(52) U.S. Cl. ......................... 525/533; 528/112
(58) Field of Search ............ 525/533; 528/112

(56) References Cited

U.S. PATENT DOCUMENTS

| | | | |
|---|---|---|---|
| 3,395,118 A | 7/1968 | Reinking et al. | 260/47 |
| 4,438,254 A | 3/1984 | Doorakian et al. | 528/89 |
| 4,480,082 A | 10/1984 | McLean et al. | 528/103 |
| 4,722,990 A | 2/1988 | Koenig et al. | 528/95 |
| 4,981,926 A | 1/1991 | Pham et al. | 525/580 |
| 5,089,588 A | 2/1992 | White et al. | 528/99 |
| 5,109,099 A | 4/1992 | Pham et al. | 528/89 |
| 5,115,075 A | 5/1992 | Brennan et al. | 528/99 |
| 5,171,820 A | 12/1992 | Mang et al. | 528/87 |
| 5,208,317 A | 5/1993 | Pham et al. | 528/89 |
| 5,246,751 A | 9/1993 | White et al. | 428/35.4 |
| 555,628 A1 * | 4/2003 | Gan et al. | 525/523 |
| 2002/0042493 A1 * | 4/2002 | Hoyles et al. | 528/87 |
| 2002/0128428 A1 * | 9/2002 | Gan et al. | 528/288 |

FOREIGN PATENT DOCUMENTS

EP 0 193 809 9/1986

* cited by examiner

*Primary Examiner*—Robert Sellers
(74) *Attorney, Agent, or Firm*—Nemia C. Damocles

(57) ABSTRACT

An epoxy or phenolic functional polyester/polyether oligomer or polymer having a functionality of greater than 2 and comprising moieties derived from diglycidyl ethers or diglycidyl esters, anhydrides and dihydric phenols. The oligomer or polymer is prepared by (1) reacting a liquid epoxy resin (LER), along with a dihydric phenol, with a cyclic anhydride, in the presence of a catalyst, the cyclic anhydride being employed in an amount sufficient to achieve the desired functionality but insufficient to form gels in the anhydride-modified epoxy resin.

11 Claims, No Drawings

EPOXY OR PHENOLIC FUNCTIONAL POLYESTER OR POLYETHER

This application claims the benefit of U.S. Provisional Application No. 60/213,965, filed Jun. 23, 2000.

BACKGROUND OF THE INVENTION

This invention relates to epoxy resins and phenolic curing agents with increased functionality and a process for making the same.

The average functionality of currently commercially available solid epoxy resins (SER) and phenolic curing agents (PCA) that are used in powder coatings is two or slightly less than two.

As used herein, the term SER or solid epoxy resin refers to a higher molecular weight polymer whose epoxy functionality is typically 2 or less than 2. The term PCA or phenolic curing agent refers to a polymer whose phenolic functionality is typically 2 or less than 2.

As used herein, the term "functionality" refers to the average number of epoxy groups per resin molecule for SER and the average number of phenolic groups per resin molecule for PCA.

Phenolic curing agents and solid epoxy resins have similar structures and are made from the same monomers. If the number of epoxy groups in the monomer change is greater than the number of phenolic groups, then an SER will result. If the number of phenolic groups is greater than the number of epoxy groups, then a PCA will result.

In many applications, especially those applications in which better high temperature performance is needed, it is often desirable to employ an epoxy resin or curing agent having an average functionality of greater than two.

Methods for increasing the epoxy functionality of epoxy resins are known. One method comprises adding an epoxy novolac to the SER to increase its functionality. This approach works well in most applications; however, the novolac adds cost and produces resins with undesirable color stability. Use of novolacs also produces low molecular weight fractions which can make the resins prone to sintering. In another method known as "bodying," a liquid epoxy resin (LER) is heated with a bisphenol in the absence of a catalyst and this results in some branching via the epoxy-epoxy reaction. A catalyst is then added to the reaction mixture to form a higher molecular weight polymer (SER). In this method, it is difficult to control the degree of reaction.

Anhydrides are usually used as curing agents for epoxy resins. It is generally thought that anhydrides create branches by reacting with the secondary hydroxyl on the epoxy polymer backbone. Thus, attempts have been made to use anhydrides to branch epoxy resins. However, these attempts have always produced a gelled product which is a fully crosslinked epoxy resin. As used herein, the term "branch" or "branching" refers to the addition of epoxy functionality to epoxy resins by the epoxy-epoxy and/or epoxy-hydroxy reaction of different epoxy resin molecules.

Another method for increasing the functionality of an epoxy resin is to branch the resin in the presence of a Li or Cs catalyst as described in U.S. Pat. No. 4,722,990. In this example, the branching must be terminated by cooling the reaction mixture or by adding a deactivating agent. It is important to terminate the branching or gelation will result.

It would be desirable to provide a process for preparing epoxy resins having an average functionality of greater than two without the disadvantages of the prior art. It is important that the epoxy resins so formed are not crosslinked systems (gels) and that they can be used with curing agents to form a thermosetting composition for use in coating applications.

SUMMARY OF THE INVENTION

In one aspect, the present invention is an epoxy or phenolic functional polyester/polyether oligomer or polymer having an epoxy functionality of greater than 2 and comprising moieties derived from diglycidyl ethers or diglycidyl esters, anhydrides and dihydric phenols.

In a second aspect, the present invention is a process for preparing the epoxy or phenolic functional polyester/polyether oligomer or polymer of the first aspect which comprises branching an epoxy resin or phenolic curing agent by (1) reacting a liquid epoxy resin (LER), along with a dihydric phenol, with a cyclic anhydride, in the presence of a catalyst, the cyclic anhydride being employed in an effective amount to increase the epoxy functionality. This effective amount is sufficient to achieve the desired epoxy or phenolic functionality but insufficient to cause the formation of gel in the anhydride-modified epoxy resin. As used herein, the term "LER" refers to a liquid diglycidyl ether or ester.

DETAILED DESCRIPTION OF THE INVENTION

The incorporation of anhydrides onto the backbone of an epoxy or phenolic polymer results in branching, the extent of which can be controlled by the amount of anhydride added to the reaction mixture. Using the present process, epoxy or phenolic resins of various equivalent weights and various levels of branching can be made.

It has now been found that the formation of gel in an anhydride-modified epoxy resin can be avoided by the process of the present invention which comprises adding an effective amount of an anhydride to the epoxy or phenolic resin to increase its functionality. This effective amount is sufficient to achieve the desired functionality but insufficient to form gel in the anhydride-modified resin.

The present reaction can be done in one step wherein a mixture of a liquid epoxy resin, anhydride, dihydric phenol and catalyst are stirred and heated to yield the final product.

Alternatively, the liquid epoxy resin and the dihydric phenol are reacted first and then the anhydride is added or, the LER and anhydride are reacted first, and then the dihydric phenol is added to the reaction. The reaction can be done using a batch process or continuous process conducted in a reactive extruder, such as that described in European Patent No. EP 0193809.

The epoxy resins which can be employed in the practice of the present invention for preparing the anhydride-modified resin (epoxy or phenolic functional polyester/polyether oligomer or polymer) include the diglycidyl ethers of dihydric phenols, such as those described in U.S. Pat. Nos. 5,246,751; 5,115,075; 5,089,588; 4,480,082 and 4,438,254, all of which are incorporated herein by reference, or the diglycidyl esters of dicarboxylic acids such as those described in U.S. Pat. No. 5,171,820. Other suitable diepoxides include α,ω-diglycidyloxyisopropylidene-bisphenol-based epoxy resins (commercially known as D.E.R.™ 300 and 600 series epoxy resins), α,ω-diglycidyloxy tetrabromoisopropylidene-bisphenol-based phenoxy resins, such as Quatrex™ 6410, both are product of The Dow Chemical Company. Preferred epoxy resins are the epoxy resins having an epoxy equivalent weight of from about 100 to about 4000. Most preferred epoxy resins are the diglycidyl ethers of bisphenol A; 4,4'-sulfonyldiphenol; 4,4-oxydiphenol; 4,4'-dihydroxybenzophenone; resorcinol; hydroquinone; 9,9'-bis(4-hydroxyphenyl)fluorene; 4,4'-dihydroxybiphenyl or 4,4'-dihydroxy-alpha-methylstilbene and the diglycidyl esters of the dicarboxylic acids mentioned previously.

The amount of epoxy resin used depends on whether a phenolic functional or epoxy functional polymer is desired. It also depends on the targeted molecular weight and functionality. In general, the epoxy resin is used in an amount of from about 10 wt. % to about 80 wt. %, more preferably, from about 30 wt. % to about 75 wt. % and, most preferably, from about 35 wt. % to about 70 wt. %, based on the weight of reactants.

The anhydrides which can be employed in the practice of the present invention for preparing the anhydride-modified resin (epoxy or phenolic functional polyester/polyether oligomer or polymer) include diglycolic anhydride, dichloromaleic anhydride, maleic anhydride, succinic anhydride, glutaric anhydride, citraconic anhydride, itaconic anhydride, tetrabromophthalic anhydride, phthalic anhydride, tetrahydrophthalic anhydride, hexahydrophthalic anhydride, tetrachlorophthalic anhydride, 4-methylhexahydrophthalic anhydride, methyl-5-norbornene-2,3-dicarboxylic anhydride, 1,8-naphthalic anhydride, trimilletic anhydride and 1,2,4,5-benzenetetracarboxylic dianhydride.

Preferred anhydrides are phthalic anhydride, maleic anhydride, tetrahydrophthalic anhydride, 4-methylhexahydrophthalic anhydride, hexahydrophthalic anhydride, methyl-5-norbornene-2,3-dicarboxylic anhydride and succinic anhydride. Most preferred are phthalic anhydride, 4-methylhexahydrophthalic anhydride, tetrahydrophthalic anhydride, hexahydrophthalic anhydride and succinic anhydride.

The amount of anhydride used depends on the molecular weight of the anhydride, the amount of branching desired in the SER or PCA and the targeted equivalent weight of the SER or PCA. In general, the anhydride is used in an amount of from about 0.1 wt. % to about 20 wt. %, preferably from about 1 wt. % to about 15 wt. % and, most preferably, from about 1 wt. % to about 10 wt. %, based on the amount of reactants used.

The dihydric phenols which can be employed in the practice of the present invention for preparing the anhydride-modified resin (epoxy or phenolic functional polyester/polyether oligomer or polymer) include 4,4'-isopropylidene bisphenol (bisphenol A), 4,4'-dihydroxydiphenylethylmethane, 3,3'-dihydroxydiphenyldiethylmethane, 3,4'-dihydroxydiphenylmethylpropylmethane, bisphenol, 4,4'-dihydroxydiphenyloxide, 4,4'-dihydroxydiphenylcyanomethane, 4,4'-dihydroxybiphenyl, 4,4'-dihydroxybenzophenone, 4,4'-dihydroxydiphenyl sulfide, 4,4'-dihydroxydiphenyl sulfone, 2,6-dihydroxynaphthalene, 1,4'-dihydroxynaphthalene, catechol, resorcinol, hydroquinone and other dihydric phenols listed in U.S. Pat. Nos. 3,395,118; 4,438,254 and 4,480,082 which are hereby incorporated by reference. In addition, mixtures of different dihydric phenols can be employed. Of these other dihydric phenols, bisphenol A, hydroquinone and mixtures thereof are most preferred.

The amount of dihydric phenol used depends on whether a phenolic functional or epoxy functional polymer is desired. It also depends on the molecular weight of the phenol, the molecular weight of the epoxy, the molecular weight of the anhydride, as well as the target equivalent weight and level of branching. In general, the dihydric phenol is used in an amount of from about 1 wt. % to about 90 wt. %, more preferably, from about 5 wt. % to about 75 wt % and, most preferably, from about 20 wt. % to about 55 wt. %, based on the weight of reactants.

Preferred catalysts are, but not limited to, phosphines, amines, quaternary ammonium and phosphonium salts, such as tetraethylammonium chloride, tetraethylammonium bromide, tetraethylammonium iodide, tetraethylammonium hydroxide, tetra(n-butyl)ammonium chloride, tetra(n-butyl)ammonium bromide, tetra(n-butyl)ammonium iodide, tetra(n-butyl)ammonium hydroxide, tetra(n-octyl)ammonium chloride, tetra(n-octyl)ammonium bromide, tetra(n-octyl)ammonium iodide, tetra(n-octyl)ammonium hydroxide, methyltris(n-octyl)ammonium chloride, bis(tetraphenylphosphoranylidene)ammonium chloride, ethyltri-p-tolylphosphonium acetate-acetic acid complex, ethyltriphenylphosphonium acetate-acetic acid complex or combinations thereof and the like as described in U.S. Pat. Nos. 5,208,317, 5,109,099 and 4,981,926. Most preferred catalysts include tetraethylammonium bromide, tetraethylammonium hydroxide, ethyltritolylphosphonium acetate and ethyltriphenylphosphonium acetate.

The amount of catalyst used depends on the molecular weight of the catalyst, the activity of the catalyst and the speed at which the polymerization is intended to proceed. In general, the catalyst is used in an amount of from 0 wt. % to about 1 wt. %, more preferably, from about 0.01 wt. % to about 0.5 wt. % and, most preferably, from about 0.1 wt. % to about 0.2 wt. %, based on the weight of reactants.

The temperature at which the reaction is most advantageously conducted depends on the specific compounds and catalyst employed. In general this temperature is from about 50° C. to about 300° C., more preferably from about 90° C. to about 280° C. and, most preferably, from about 140° C. to about 250° C.

The epoxy resins (epoxy-functional polyester/polyether oligomer or polymer) of the present invention can be cured with a variety of epoxy curing agents such as phenolics, amines, carboxylic acids, phenol formaldehyde resins, and anhydrides, as well as through the hydroxyl group or an epoxy group. The epoxy resins of the present invention can be reacted with a hardener such as, for example, an amine-terminated polymer, a carboxy-terminated polymer, a phenol-terminated polymer, a multifunctional amine, carboxylic acid or phenol.

The phenolic curing agents (phenolic-functional polyester/polyether oligomer or polymer) of the present invention can be cured with a variety of epoxy functional resins. These resins can include but are not limited to any of the epoxy functional monomers, oligomers or polymers mentioned previously in this patent.

The epoxy resins and phenolic functional curing agents of the present invention can be used in a variety of industrial applications or other epoxy applications such as coatings, laminates and composites. Industrial coatings are surface protective coatings (paint coatings) applied to substrates and typically cured or crosslinked to form continuous films for decorative purposes as well as to protect the substrate. A protective coating ordinarily comprises an organic polymeric binder, pigments, and various paint additives, where the polymeric binder acts as a fluid vehicle for the pigments and imparts Theological properties to the fluid paint coating. Upon curing or crosslinking, the polymeric binder hardens and functions as a binder for the pigments and provides adhesion of the dried paint film to the substrate. The pigments may be organic or inorganic and functionally contribute to opacity and color in addition to durability and hardness. The manufacture of protective coatings involves the preparation of a polymeric binder, mixing of component materials, grinding of pigments in the polymeric binder, and thinning to commercial standards.

The polymeric binder can include a wide variety of other additives such as, for example, hardeners, dyes, pigments and flow modifiers, fire-retardants, self-extinguishing agents, desiccants and all manner of additives which are used herein for their known purposes. Examples of fire retardants include: boric acid, monoammonium phosphate, diamonium phosphate and aluminum trihydrate. These additives can be in the form of liquids or particles so long as the binder remains solid when cured, has the desired particle size or viscosity and impart no adverse effects to the binder.

Powder paints can be obtained which comprise the epoxy resins of the present invention, and suitable pigments, catalysts and additives. These powder paints and coatings therefrom have a surprisingly good combination of highly prized properties. Depending on the choice and the amount of polymer, crosslinker, catalyst and other components one can obtain, for example, good flow, good chemical resistance, high gloss, high scratch resistance, good mechanical properties, good outdoor durability and good color stability.

Water-dispersed coating compositions containing the epoxy resins of the present are highly desirable for can and coil coating compositions.

The following examples are for illustrative purposes only and are not intended to limit the scope of this invention. Unless otherwise indicated, all parts and percentages are by weight.

EXAMPLES

The following materials were used in the examples.

| | |
|---|---|
| D.E.R. ™ 383 | A diglycidyl ether of bisphenol-A, having an epoxy equivalent weight (EEW) of 180, a product of The Dow Chemical Company. |
| D.E.R. ™ 332 | A diglycidyl ether of bisphenol-A; EEW = 172 to 176, a product of The Dow Chemical Company. |
| D.E.R. ™ 664U | A solid epoxy resin (SER), EEW = 875–955. |
| D.E.R. ™ 665U | A solid epoxy resin (SER), EEW = 955–1400. |
| D.E.R. ™ 672U | Novolac-modified SER. |
| D.E.H. ™ 84 | Phenolic curing agent. |
| D.E.H. ™ 85 | Phenolic curing agent. |
| TIPURE ™ R706 | TiO$_2$, a product of DuPont. |
| RESIFLOW ™ P-67 | Flow modifier, a product of Estron Chemicals. |
| BENZOIN | Air release agent sold by Aldrich Chemicals. |

Example 1

A slurry of the liquid epoxy resin, bisphenol-A and phthalic anhydride (charges based on the target equivalent weight and anhydride loading) are charged into a resin kettle. The mixture is stirred and heated (mantle setpoint of 180° C.). After the bisphenol-A and phthalic anhydride dissolved in the LER, 1500 ppm of catalyst (ethyl tri-p-phenyl phosphonium acetate) is added to the mixture. An exotherm is observed in all these reactions and once the peak temperature is reached, the product is poured onto aluminum foil.

Example 2

A one liter resin kettle is charged with 300.0 g of D.E.R.™ 332, a diglycidyl ether of bisphenol-A, 136.3 g of bisphenol-A, 15.1 g of phthalic anhydride and 0.214 g of a 70% solution of catalyst (ethyl tri-p-phenyl phosphonium acetate) in methanol. The mixture is stirred and the kettle is nitrogen padded and heated using an electric heating mantle until the reaction exotherm is complete. Typically, the reaction product is poured out on aluminum foil to cool. The $T_g$ of the resulting polymer is 74.4° C., the epoxy equivalent weight (EEW) is 1150 and the viscosity is 119 Pa·s at 150° C.

The ratio of the reactants can be changed to achieve the desired level of branching and epoxy equivalent weight.

Example 3

Several different epoxy polymers were made with various liquid epoxy resins (LER) as starting material. These new resins had different amounts of phthalic anhydride (PA) modification and different target epoxide equivalent weights (EEW). The epoxy reactor charge data is shown below and the physical properties of the resultant resins is shown below.

TABLE 1

Epoxy Resin Reactor Charge Data

| | | Weight Percent Raw Material | | | |
|---|---|---|---|---|---|
| Resin # | LER type | LER | Bis-A | PA | Catalyst[a] |
| 1 | D.E.R. ™ 332 | 69.07 | 26.11 | 4.61 | 0.214 |
| 2 | D.E.R. ™ 332 | 70.53 | 23.41 | 5.85 | 0.214 |
| 3 | D.E.R. ™ 332 | 66.31 | 30.13 | 5.05 | 0.214 |
| 4 | D.E.R. ™ 383 | 68.19 | 31.60 | 0.00 | 0.214 |
| 5 | D.E.R. ™ 383 | 67.97 | 30.23 | 1.59 | 0.214 |
| 6 | D.E.R. ™ 383 | 67.74 | 28.84 | 3.20 | 0.214 |
| 7 | D.E.R. ™ 383 | 69.51 | 27.25 | 3.03 | 0.214 |

[a]Ethyl tri-p-phenyl phosphonium acetate catalyst 70% in Methanol

TABLE 2

Epoxy Resin Physical Properties

| Resin # | EEW | Viscosity (Pa · s)[a] | Tg (C)[b] |
|---|---|---|---|
| 1 | 772 | 18.3 Pa · s | 60.8° C. |
| 2 | 667 | 9.7 Pa · s | 57.9° C. |
| 3 | 1150 | 119.5 Pa · s | 74.4° C. |
| 4 | 1131 | 21.3 Pa · s | 68.3° C. |
| 5 | 1075 | 36.7 Pa · s | 68.6° C. |
| 6 | 1120 | 100.0 Pa · s | 71.6° C. |
| 7 | 848 | 21.9 Pa · s | 64.4° C. |

[a]Measured with a Paar Physica cone and plate viscometer at 150° C.
[b]Measured by DSC with a 20° C./minute scan rate.

Example 4

Powder coatings were then formulated with Resins 2, 3 and 7. The coating formulations are shown in Table 3 and the performance data for these systems are shown in Table 4.

TABLE 3

Coating Formulations

Weight Percent in Formulation

| Raw Material | 1 | 2 | 3 | 4 | 5 | 6 |
|---|---|---|---|---|---|---|
| RESIN 2 | 48.0 | | | | | |
| RESIN 3 | | 54.1 | | | | |
| RESIN 7 | | | | 51.0 | | |
| D.E.R. ™ 665U[1] | | | 55.1 | | | |
| D.E.R. ™ 664U[1] | | | | | 51.7 | |
| D.E.R. ™ 672U[1] | | | | | | 50.6 |
| D.E.H. ™ 84[1] | 18.0 | 11.9 | 10.9 | 7.5 | 7.1 | 7.7 |
| D.E.H. ™ 85[2] | | | | 7.5 | 7.1 | 7.7 |
| TiPure ™[3] R706 | 32.0 | 32.0 | 32.0 | 32.0 | 32.0 | 32.0 |
| Resiflow ™[5] P-67 | 1.5 | 1.5 | 1.5 | 1.5 | 1.5 | 1.5 |
| BENZOIN[6] | 0.5 | 0.5 | 0.5 | 0.5 | 0.5 | 0.5 |

TABLE 4

Coating Performance

| Formulation # | Gel Time (s) | Tg (° C.) | Peak Exotherm | Forward Impact | Reverse impact | 170° C. E' (× 10$^6$ dyn/cm$^2$) |
|---|---|---|---|---|---|---|
| 1 | 33.8 | 102.3° C. | 152.5° C. | 160 in · lb | 160 in · lb | 62.9 |
| 2 | 597 | 100.7° C. | 163.7° C. | 160 in · lb | 160 in · lb | 40.8 |
| 3 | 159.1 | 98.8° C. | 168.5° C. | 140 in · lb | 140 in · lb | 6.7 |
| 4 | 130 | 102.9° C. | 184.6° C. | 160 in · lb | 160 in · lb | 30.0 |
| 5 | 294 | 101.2° C. | 188.8° C. | 160 in · lb | 160 in · lb | 8.5 |
| 6 | 130 | 101.7° C. | 188.6° C. | 160 in · lb | 160 in · lb | 43.5 |

Formulations 1, 2 and 4 were made with phthalic anhydride-modified resin while formulations 3, 5 and 6 were made with standard epoxy resin. All of the systems performed well but the phthalic anhydride-modified systems were more flexible, of higher reactivity, higher rubber plateau modulus and had higher $T_g$ than the standards.

The results above indicate that anhydrides can be successfully used to branch solid epoxy resins. Coatings made from these polymers exhibit excellent physical properties when compared to those made with standard SER.

What is claimed is:

1. An epoxy or phenolic functional polyester or polyether oligomer or polymer having an epoxy or phenolic functionality of greater than 2 and comprising moieties derived from diglycidyl ethers or diglycidyl esters, anhydrides and dihydric phenols.

2. The epoxy or phenolic functional polyester or polyether oligomer or polymer of claim 1 wherein the diglycidyl ether is selected from the group consisting of the diglycidyl ethers of bisphenol A: 4,4'-sulfonyldiphenol; 4,4-oxydiphenol: 4,4'-dihydroxybenzophenone; resorcinol; hydroquinone; 9,9'-bis(4-hydroxyphenyl)fluorene; 4,4'-dihydroxybiphenyl and 4,4'-dihydroxy-alpha-methylstilbene.

3. The epoxy or phenolic functional polyester or polyether oligomer or polymer of claim 1 wherein the diglycidyl ester is selected from the group consisting of the diglycidyl esters of dicarboxylic acids.

4. The epoxy or phenolic functional polyester or polyether oligomer or polymer of claim 1 wherein the anhydride is selected from the group consisting of phthalic anhydride, maleic anhydride, tetrahydrophthalic anhydride, 4-methylhexahydrophthalic anhydride, hexahydrophthalic anhydride, methyl-5-norbornene-2,3-dicarboxylic anhydride and succinic anhydride.

5. The epoxy or phenolic functional polyester or polyether oligomer or polymer of claim 1 wherein the anhydride is selected from the group consisting of phthalic anhydride, 4-methylhexahydro-phthalic anhydride, tetrahydrophthalic anhydride, hexahydrophthalic anhydride and succinic anhydride.

6. The epoxy or phenolic functional polyester or polyether oligomer or polymer of claim 1 wherein the dihydric phenol is selected from the group consisting of 4,4'-isopropylidene bisphenol (bisphenol A), 4,4'-dihydroxydiphenylethylmethane, 3,3'-dihydroxy-diphenyldiethylmethane, 3,4'-dihydroxy-diphenylmethylpropylmethane, 4,4'-dihydroxydiphenyloxide, 4,4'-dihydroxydiphenylcyanomethane, 4,4'-dihydroxy-biphenyl, 4,4'-dihydroxybenzophenone, 4,4'-dihydroxydiphenyl sulfide, 4,4'-dihydroxydiphenyl sulfone, 2,6-dihydroxynaphthalene, 1,4'-dihydroxynaphthalene, catechol, resorcinol and hydroquinone.

7. The epoxy or phenolic functional polyester or polyether oligomer or polymer of claim 1 wherein the dihydric phenol is selected from the group consisting of bisphenol A, hydroquinone and mixtures thereof.

8. A binder composition comprising the epoxy or phenolic functional polyester or polyether oligomer or polymer of claim 1.

9. The binder composition of claim 8 containing pigments, fillers or flow modifiers.

10. Powder coatings comprising the binder composition of claim 8.

11. The epoxy or phenolic functional polyester or polyether oligomer or polymer of claim 1 wherein the anhydride is selected from the group consisting of diglycolic anhydride, dichloromaleic anhydride, maleic anhydride, succinic anhydride, glutaric anhydride, citraconic anhydride, itaconic anhydride, tetrabromophthalic anhydride, phthalic anhydride, tetrahydrophthalic anhydride, hexahydrophthalic anhydride, tetrachlorophthalic anhydride, 4-methylhexahydrophthalic anhydride, methyl-5-norbornene-2,3-dicarboxylic anhydride, 1,8-naphthalic anhydride, trimilletic anhydride and 1,2,4,5-benzenetetracarboxylic dianhydride.

* * * * *